United States Patent
Li et al.

(10) Patent No.: US 9,430,008 B2
(45) Date of Patent: Aug. 30, 2016

(54) APPARATUS AND METHOD FOR OPTIMIZING USE OF NVDC CHARGERS

(71) Applicant: Texas Instruments Incorporated, Dallas, TX (US)

(72) Inventors: Qiong M. Li, Allen, TX (US); Jinrong Qian, Plano, TX (US); Suheng Chen, Knoxville, TN (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 261 days.

(21) Appl. No.: 14/062,404

(22) Filed: Oct. 24, 2013

(65) Prior Publication Data
US 2014/0229748 A1 Aug. 14, 2014

Related U.S. Application Data

(60) Provisional application No. 61/764,412, filed on Feb. 13, 2013.

(51) Int. Cl.
*G06F 1/26* (2006.01)
*G06F 1/28* (2006.01)
*G06F 1/30* (2006.01)
(Continued)

(52) U.S. Cl.
CPC . *G06F 1/26* (2013.01); *G06F 1/28* (2013.01); *G06F 1/30* (2013.01); *G06F 1/3212* (2013.01); *H02J 7/0068* (2013.01); *H02J 9/002* (2013.01);
(Continued)

(58) Field of Classification Search
CPC .............. H02J 1/10; H02J 1/14; G06F 1/28; G06F 1/30; G06F 1/3212; G06F 1/26; Y10T 307/625; Y10T 307/604
See application file for complete search history.

(56) References Cited

U.S. PATENT DOCUMENTS

2005/0242772 A1* 11/2005 Cha ........................... H02J 7/34
    320/115
2006/0080559 A1* 4/2006 Sauber ..................... G06F 1/28
    713/300

(Continued)

OTHER PUBLICATIONS

Xiaoguo Liang; Li, P.; Jayakanthan, G., "Evaluation of Narrow Vdc-Based Power Delivery Architecture in Mobile Computing System," in Industry Applications, IEEE Transactions on , vol. 47, No. 6, pp. 2539-2548, Nov.-Dec. 2011.*

(Continued)

*Primary Examiner* — Jaweed A Abbaszadeh
*Assistant Examiner* — Brian J Corcoran
(74) *Attorney, Agent, or Firm* — William B. Kempler; Frank D. Cimino

(57) ABSTRACT

A method includes detecting removal or depletion of a power supply associated with a powered device. The powered device is configured to receive power from a power adapter via a narrow-voltage direct current/direct current (NVDC) charger and from the power supply. The method also includes, in response to the detection, disabling a dynamic power management function of the NVDC charger. The method further includes monitoring input current or input power provided to the powered device by the NVDC charger and determining if the input current or input power exceeds a threshold. In addition, the method includes, if the input current or input power exceeds the threshold, triggering a throttling of an operating clock frequency of the powered device. The method could also include (i) disabling a specified mode of operation and turning on a voltage regulator of the NVDC charger in response to the detection and (ii) providing over-voltage protection.

13 Claims, 4 Drawing Sheets

(51) Int. Cl.
*G06F 1/32* (2006.01)
*H02J 7/00* (2006.01)
*H02J 9/00* (2006.01)

(52) U.S. Cl.
CPC ......... *Y02B 60/1292* (2013.01); *Y10T 307/604* (2015.04); *Y10T 307/625* (2015.04)

(56) References Cited

U.S. PATENT DOCUMENTS

| | | | | |
|---|---|---|---|---|
| 2012/0235630 A1* | 9/2012 | Qiu | .......................... | H02J 7/045 320/107 |
| 2013/0339757 A1* | 12/2013 | Reddy | ................... | G06F 1/3212 713/300 |
| 2014/0032953 A1* | 1/2014 | Wei | ....................... | G06F 1/3234 713/323 |

OTHER PUBLICATIONS

"I2C Controlled 4.5A Single Cell USB/Adapter Charger with Narrow VDC Power Path Management and USB OTG"; Texas Instruments; Jan. 2012—Revised Oct. 2012.

Lingyin Zhgao; "Design of a Narrow VDC (NVDC) System Charger Voltage Regulator Using bq24721/30" Texas Instruments; Application Report; Jan. 2007.

"2-4 Cell Li+ Battery SMBus Charge Controller with N-Channel Power MOSFET Selector and Advanced Circuit Protection"; Texas Instruments; bq24725; Jul. 2010—Revised Nov. 2010.

"3-4 Cell NVDC-1 Battery Charger Controller with Ultra-Fast Transient Response and High Light-Loan Efficiency" Texas Instruments; bq24717; Mar. 2013 (Product released Feb. 2013).

"2-3 Cell NVDC-1 Battery Charger Controller with Ultra-Fast Transient Response and High Light-Loan Efficiency" Texas Instruments; bq24715; Mar. 2013 (Product released Feb. 2013).

* cited by examiner

APPARATUS AND METHOD FOR OPTIMIZING USE OF NVDC CHARGERS

CROSS-REFERENCE TO RELATED APPLICATION AND PRIORITY CLAIM

This application claims priority under 35 U.S.C. §119(e) to U.S. Provisional Patent Application No. 61/764,412 filed on Feb. 13, 2013, which is hereby incorporated by reference in its entirety.

TECHNICAL FIELD

This disclosure is generally directed to power supply charging systems. More specifically, this disclosure is directed to an apparatus and method for optimizing the use of narrow-voltage direct current/direct current (NVDC) chargers.

BACKGROUND

Many electronic devices, such as laptop or notebook computers, previously used "direct power path" battery chargers for charging internal power supplies. A "direct power path" charger provides an electrical path directly between an alternating current-to-direct current (AC/DC) power adapter and a powered electronic device. With increasing demand for smaller and lighter electronic devices, narrow-voltage DC/DC (NVDC) battery chargers have been developed for achieving higher system efficiencies and smaller system sizes. In a conventional NVDC battery charger, a voltage regulator is positioned between an AC/DC power adapter and a powered electronic device.

SUMMARY

This disclosure provides an apparatus and method for optimizing the use of narrow-voltage direct current/direct current (NVDC) chargers.

In a first example, a method includes detecting removal or depletion of a power supply associated with a powered device. The powered device is configured to receive power from a power adapter via a narrow-voltage direct current/direct current (NVDC) charger and from the power supply. The method also includes, in response to the detection, disabling a dynamic power management (DPM) function of the NVDC charger. The method further includes monitoring input current or input power provided to the powered device by the NVDC charger and determining if the input current or input power exceeds a threshold. In addition, the method includes, if the input current or input power exceeds the threshold, triggering a throttling of an operating clock frequency of the powered device.

In a second example, an apparatus includes a narrow-voltage direct current/direct current (NVDC) charger configured to be coupled to a power adapter and a powered device. The NVDC charger is configured to detect removal or depletion of a power supply associated with the powered device. The NVDC charger is also configured, in response to the detection, to disable a dynamic power management (DPM) function of the NVDC charger. The NVDC charger is further configured to monitor input current or input power provided to the powered device by the NVDC charger and determine if the input current or input power exceeds a threshold. In addition, the NVDC charger is configured, if the input current or input power exceeds the threshold, to trigger a throttling of an operating clock frequency of the powered device.

In a third example, a system includes a powered device associated with a power supply, a power adapter, and a narrow-voltage direct current/direct current (NVDC) charger configured to be coupled to the power adapter and the powered device. The NVDC charger is configured to detect removal or depletion of the power supply. The NVDC charger is also configured, in response to the detection, to disable a dynamic power management (DPM) function of the NVDC charger. The NVDC charger is further configured to monitor input current or input power provided to the powered device by the NVDC charger and determine if the input current or input power exceeds a threshold. In addition, the NVDC charger is configured, if the input current or input power exceeds the threshold, to trigger a throttling of an operating clock frequency of the powered device.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 5, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1:
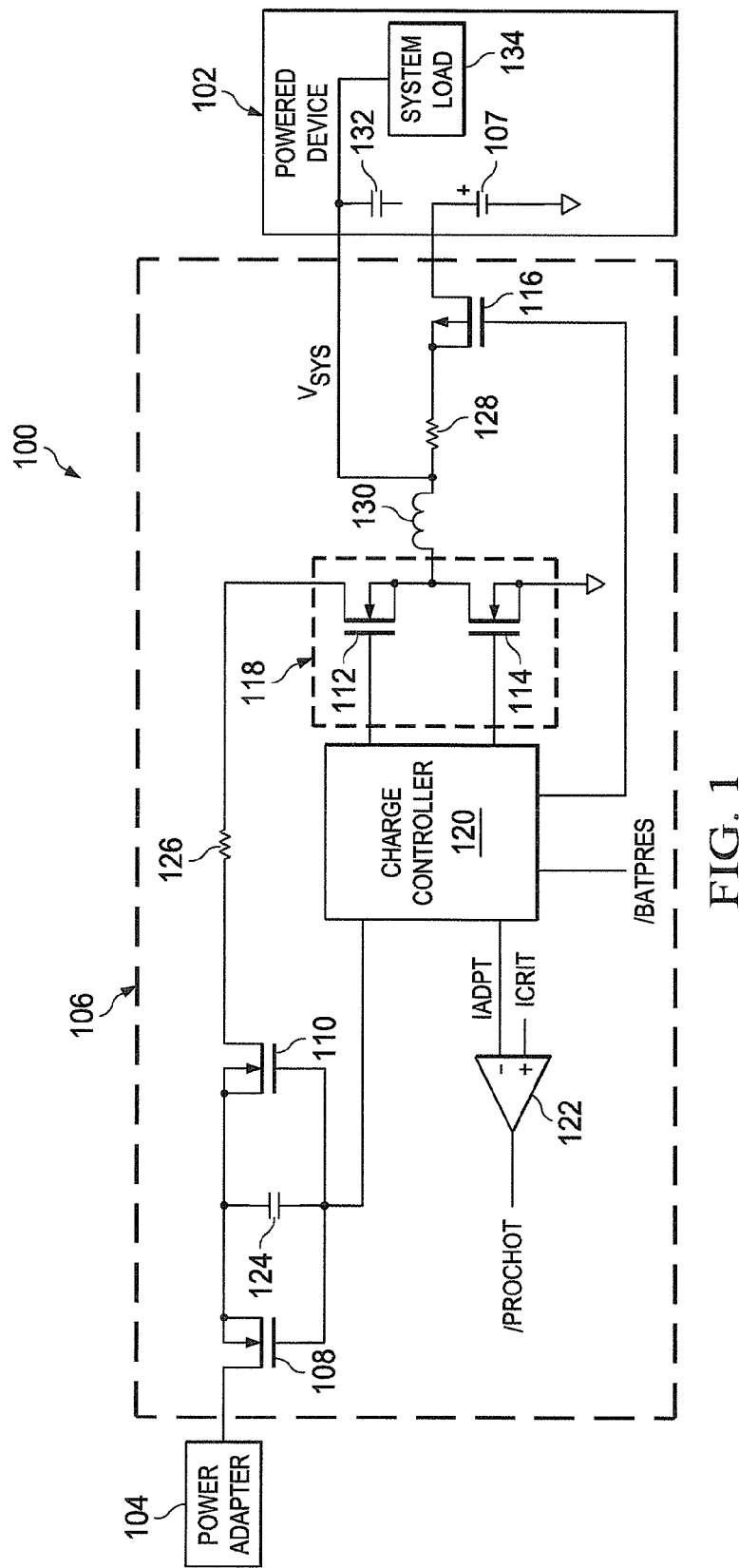
FIG. 1 illustrates an example system having a narrow-voltage direct current/direct current (NVDC) charger in accordance with this disclosure.

FIG. 1 illustrates an example system 100 having a narrow-voltage direct current/direct current (NVDC) charger in accordance with this disclosure. As shown in FIG. 1, the system 100 includes a powered device 102, a power adapter 104, and an NVDC charger 106. The powered device 102 generally represents a device or system that includes at least one power supply 107 and receives operating power from the power adapter 104. The powered device 102 could, for example, represent a laptop or notebook computer. Note, however, that the powered device 102 could represent any other suitable device or system. The power supply 107 includes any suitable source of power for the powered device 102, such as one or more batteries. The powered device 102 here also includes a bus capacitor 132 and a system load 134. The bus capacitor 132 represents a capacitor used to help smooth variations in a system voltage $V_{SYS}$ received by the powered device 102. The system load 134 generally represents the electrical components that operate using the system voltage $V_{SYS}$.

The power adapter 104 converts incoming power into a suitable form and provides the converted power to the NVDC charger 106. The power adapter 104 provides any suitable power conversion functionality. For example, in some embodiments, the power adapter 104 represents an alternating current-to-direct current (AC/DC) power adapter that provides any suitable amount of output power, such as 65 W or other amount of power. However, other types of power adapters could also be used, such as a DC/DC power adapter.

The NVDC charger 106 generally operates by receiving power from the power adapter 104 and providing the power to the powered device 102. More specifically, the NVDC charger 106 provides operating power to the powered device 102, meaning the power needed by the system load 134 to perform one or more desired functions. The NVDC charger 106 also provides power for recharging the power supply 107 within the powered device 102. As described in more detail below, operation of the NVDC charger 106 varies depending on whether the power supply 107 has been removed or depleted.

As shown in FIG. 1, the NVDC charger 106 includes various transistors 108-116. The transistor 108 is used to control the amount of input power provided to the NVDC charger 106 from the power adapter 104. The transistor 108 is also used to control an in-rush current received from the power adapter 104 during power-up. The transistor 110 is used to prevent reverse current from flowing when the power adapter 104 is not coupled to the NVDC charger 106. Transistors 112-114 form a voltage regulator 118 used to regulate the system voltage $V_{SYS}$ that is output to the powered device 102 and to control the charge on the power supply 107. The transistor 116 is also used to control the charge on the power supply 107 and to reduce conduction losses during discharge of the power supply 107. The transistor 116 can also operate in linear mode when the power supply 107 is depleted in order to maintain the system voltage $V_{SYS}$ provided to the powered device 102 at least at a predefined minimum value.

Each transistor 108-116 includes any suitable switching device. For example, the transistor 108 could represent an ACFET transistor, the transistors 110-114 could represent FET transistors, and the transistor 116 could represent a BATFET transistor. The voltage regulator 118 includes any suitable voltage regulating structure. In this example, the voltage regulator 118 represents a buck converter, although other voltage regulators could also be used.

A charge controller 120 controls the overall operation of the NVDC charger 106. For example, the charge controller 120 generates drive signals that are provided to gates of the transistors 108-116. The drive signals are used to control the operation of the transistors 108-116 in order to provide the various functions described above and below.

The charge controller 120 can also receive one or more input signals and generate one or more output signals. For example, in this example implementation, the charge controller 120 receives an input signal /BATPRES, which indicates whether a power supply 107 is currently present and outputting sufficient power in the powered device 102. The /BATPRES signal can be obtained from any suitable source, such as the power supply 107 or a system voltage comparator that identifies when the power supply 107 is removed or depleted. The charge controller 120 also generates an output signal IADPT, which represents the amount of current received from the power adapter 104. Note that these signals are for illustration only and that any other or additional inputs and outputs could be used or generated by the charge controller 120. For instance, instead of or in addition to the IADPT signal, the charge controller 120 could generate an output signal representing the amount of power received from the power adapter 104.

The charge controller 120 includes any suitable structure for generating signals to control operation of an NVDC charger. For example, the charge controller 120 could represent a microprocessor, microcontroller, digital signal processor, field programmable gate array, application specific integrated circuit, or discrete logic. In particular embodiments, the charge controller 120 could implement one or more pulse width modulation (PWM) controllers that adjust the duty cycles of the drive signals for the transistors 108-116.

A comparator 122 compares the output signal IADPT from the charge controller 120 to a specified current limit ICRIT. The comparator 122 then generates an output signal PROCHOT based on the comparison. The output signal PROCHOT is indicative of whether the output signal IADPT exceeds the current limit ICRIT. Note that a specified power limit could be used in place of or in addition to the specified current limit ICRIT. The comparator 122 includes any suitable structure for comparing signals.

In addition, the NVDC charger 106 includes a capacitor 124, resistors 126-128, and an inductor 130. The capacitor 124 is coupled in parallel across the sources and gates of the transistors 108-110. The resistor 126 is coupled between the transistor 110 and the voltage regulator 118. The resistor 128 and the inductor 130 are coupled in series between the voltage regulator 118 and the transistor 116. The capacitor 124 includes any suitable capacitive structure having any suitable capacitance, such as a 0.1 µF capacitor. Each resistor 126-128 includes any suitable resistive structure having any suitable resistance. The inductor 130 includes any suitable inductive structure having any suitable inductance.

One advantage of conventional NVDC chargers is that the chargers can generate lower system voltages, which could be about the same as the voltage of the power supply 107. As a result, downstream DC/DC converters (such as a CPU core regulator in the system load 134) can operate at very high switching frequencies with devices having lower voltage ratings. This can help to reduce or minimize system size and maximize system efficiency. Another advantage is that the power supply 107 can automatically provide supplemental power to the system load 134 when power from the power adapter 104 is inadequate, such as for meeting pulsating power needs of the system load 134.

Unfortunately, there are several potential problems with conventional NVDC chargers. A first problem involves attempting to maximize system performance with a deeply discharged power supply 107 or without a power supply 107. A second problem involves maintaining system operation when the powered device 102 is operating in a "learn" mode or "peak power shift" mode and the power supply 107 is removed. A third problem involves how to achieve system over-voltage protection.

With respect to the first problem, power usage by the system load 134 can vary over time. As an example, for laptop computers, system load on a central processing unit (CPU) or graphics processing unit (GPU) is very dynamic, and peak power usage of the CPU or GPU could exceed the maximum power available from the power adapter 104. When the system's peak power exceeds the power received from the adapter 104, the power supply 107 can be discharged to provide additional power to the system load 134 (as long as the power supply 107 has adequate remaining capacity). However, when the power supply 107 is depleted or removed, the power supply 107 cannot provide additional power to the system load 134.

Figure 2:
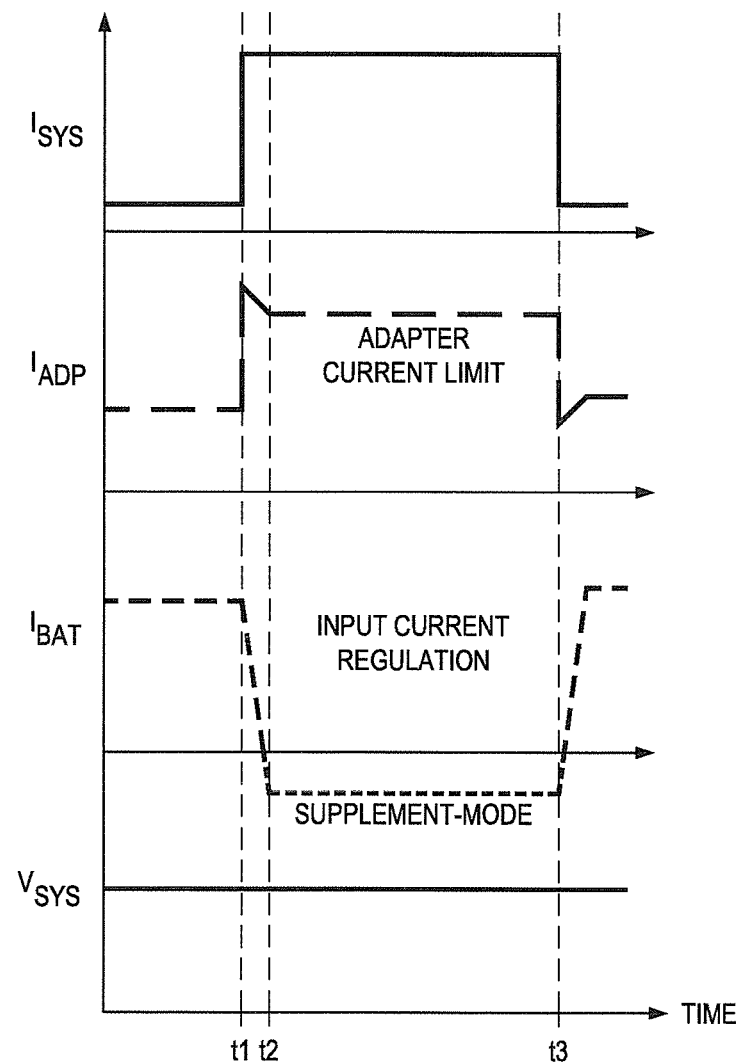
FIG. 2 illustrates example operation of a conventional Dynamic Power Management (DPM) algorithm for an NVDC charger.

As another example, FIG. 2 illustrates example operation of a conventional Dynamic Power Management (DPM) algorithm for an NVDC charger. In particular, FIG. 2 illustrates the system DPM response of an NVDC charger during a load transient. A DPM algorithm generally involves reducing power consumption or shutting down components of a powered device to minimize power consumption. Here, $I_{SYS}$ represents current provided to the powered device 102, $I_{ADP}$ represents current received from the power adapter 104, $I_{BAT}$ represents current provided to (+) or from (−) the power supply 107, and $V_{sys}$ represents the system voltage provided to the powered device 102. When the system load increases at time t1, the input power from the power adapter 104 cannot support charging of the power supply 107 and the system load at the same time. As a result, charge current to the power supply 107 starts to decrease in order to maintain the $I_{ADP}$ current at a predefined limited value. After the $I_{BAT}$ charge current reduces to zero, if the system load is still higher than the input power, the power supply's current reverses to discharge current in order to supplement the system power.

In either case, as long as the power supply's remaining capacity is high enough, system power can be optimized by dynamically adjusting the charge and discharge currents from the power supply 107 while maximizing the adapter power. However, when the power supply 107 is depleted or removed, the power supply 107 cannot supplement the adapter power. If the system power is higher than the adapter power, the DPM function starts to draw additional power from the powered device's bus capacitor 132, and the system voltage decreases in order to maintain the input power. Eventually, this can cause the powered device 102 to crash.

These situations are traditionally solved by immediately performing CPU throttling as soon as the power supply 107 is removed or depleted. In the CPU throttling state, the operating clock frequency of the system load's CPU is significantly reduced so that the required system power is reduced to be less than the input power, thereby helping to prevent a system crash. One drawback of this approach is that CPU throttling occurs whenever the power supply 107 is removed or depleted, even when input power from the power adapter 104 is large enough to support system power. Thus, the system has lower performance all the time when the CPU is throttled, and the system may not fully use the adapter power in CPU throttling mode.

With respect to the second problem, during some periods of operation, the NVDC charger 106 is not used to charge the power supply 107. At these times, the power supply 107 can be discharged during a "learn" mode in which the powered device 102 can calibrate how it measures the "state of charge" of the power supply 107. This can occur even when the power adapter 104 is connected. During these times, the power supply 107 can also be discharged during a "peak power shift" mode in which the powered device 102 shifts adapter power usage from one time to another time by using power from the power supply 107 instead of from the power adapter 104.

In either mode, power can be provided by the power supply 107 only. If an end user suddenly removes the power supply 107 during the learn mode or peak power shift mode, the powered device 102 can lose power immediately without active control, even though the power adapter 104 may be connected to the powered device 102.

In conventional "direct power path" chargers, a transistor in the same position as the transistor 108 can be turned off to disconnect input power to a powered device during these modes. In order to prevent a system crash when the power supply is removed, this transistor can be turned on quickly upon detection of the power supply removal. In conventional NVDC chargers, the presence of a voltage regulator between the power adapter and the powered device delays the supply of power to the powered device after removal of the power supply is detected. This can cause a system crash and provide a bad user experience.

With respect to the third problem, one advantage of NVDC chargers is that a narrower range of system voltages is generated for a powered device. For example, with a 19V power adapter 104, the maximum system voltage may be only 8.4V instead of 19V when using a 2S battery as the power supply 107. Because of this, a circuit connected to a system rail can be designed to have a lower voltage rating (such as 12V) instead of a higher voltage rating (such as 30V). However, if the high-side transistor (transistor 112) of the voltage regulator 118 is shorted for any reason, the system rail is connected directly to the input voltage through the transistors 108-110. The system voltage therefore becomes the input voltage and could damage components connected to the system rail that have a lower voltage rating.

Figure 3:
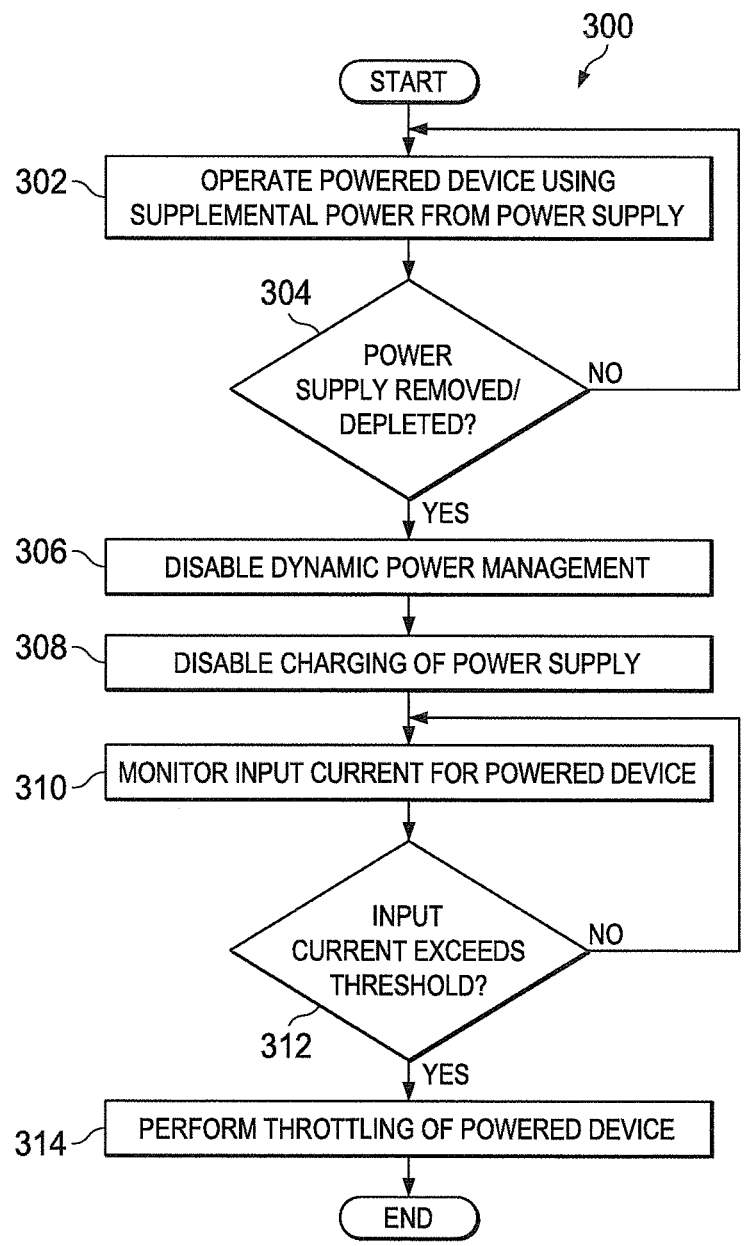
FIG. 3 illustrates an example method for providing DPM with an NVDC charger in accordance with this disclosure.

The NVDC charger 106 solves the first problem using a modified DPM algorithm. FIG. 3 illustrates an example method 300 for providing DPM with an NVDC charger 106 in accordance with this disclosure. As shown in FIG. 3, a powered device is operated using supplemental power from its power supply at step 302. This could include, for example, the system load 134 receiving operating power from the power adapter 104 and from a battery or other power supply 107. This could occur, for instance, when the power adapter 104 cannot provide adequate power to the system load 134.

A determination is made whether the power supply is removed or depleted at step 304. This could include, for example, the charge controller 120 determining whether a user of the powered device 102 has manually removed the power supply 107. This could also include the charge controller 120 determining whether energy supplied from the power supply 107 falls to zero or to a very low level. As a particular example, this could include the charge controller 120 using the /BATPRES control signal.

If the power supply has not been removed or depleted, the method 300 returns to step 302 to continue operating the powered device. If the power supply has been removed or depleted, dynamic power management is disabled at step 306, and charging of the power supply is disabled at step 308. This could include, for example, the charge controller 120 disabling the dynamic power management functionality of the charge controller 120. This could also include the charge controller 120 controlling the transistors 112-116 to disable charging of the power supply 107. Each disabling could be done in any suitable manner, such as automatically or through register bits by a host (like through an SMBUS or I2C host-controlled register bit).

When the DPM function is disabled, the input current or input power to the powered device 102 increases accordingly when system power increases in order to maintain the system bus voltage $V_{SYS}$. As a result, during this time, input current for the powered device is monitored at step 310 and compared to a threshold at step 312. This could include, for example, the charge controller 120 outputting a measure of the powered device's current as the output signal IADPT. This could also include the comparator 122 comparing the output signal IADPT to a specified current limit ICRIT. If the input current for the powered device exceeds the threshold, throttling of the powered device occurs at step 314. This could include, for example, the comparator 122 pulling the PROCHOT low to trigger throttling of the system load 134. The throttling of the powered device 102 can involve reducing the operating clock frequency of the system load 134. As noted above, input power for the powered device can also be monitored and compared to its own threshold in order to control the DPM algorithm.

This technique can help to increase or maximize use of power from the power adapter 104 before throttling occurs. This control scheme can fully use adapter power while maintaining system performance, allowing both adapter power and system performance to be optimized.

Figure 4:
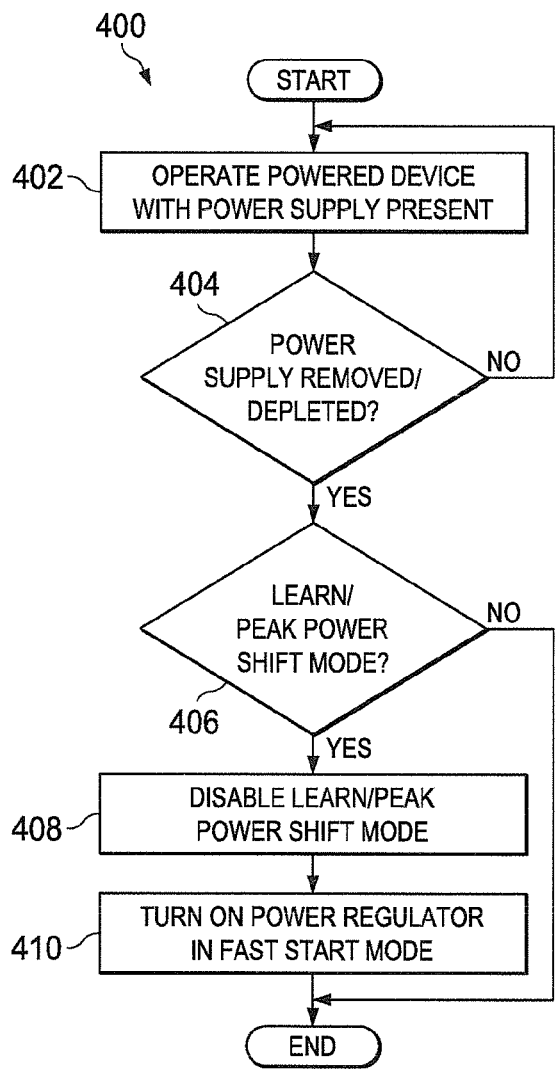
FIG. 4 illustrates an example method for supporting a learn or peak power shift mode with an NVDC charger in accordance with this disclosure.

The NVDC charger 106 solves the second problem by keeping the transistors 108-110 turned on and selectively placing the transistors 112-114 of the voltage regulator 118 into a high impedance state when the power supply 107 is in a learn or peak power shift mode. FIG. 4 illustrates an example method 400 for supporting a learn or peak power shift mode with an NVDC charger 106 in accordance with this disclosure. As shown in FIG. 4, a powered device is operated with its power supply present at step 402. This could include, for example, the system load 134 operating with a battery or other power supply 107 present.

A determination is made whether the power supply is removed or depleted at step 404. This could include, for example, the charge controller 120 determining whether a user of the powered device 102 has manually removed the power supply 107. This could also include the charge controller 120 determining whether energy supplied from the power supply 107 falls to zero or to a very low level. As a particular example, this could include the charge controller 120 using the /BATPRES control signal.

If the power supply has not been removed or depleted, the method 400 returns to step 402 to continue operating the powered device. If the power supply has been removed or depleted, a determination is made whether the powered device is operating in one of one or more specified modes at step 406. This could include, for example, the charge controller 120 determining whether the powered device 102 is operating in a learn mode or a peak power shift mode. When operating in either mode, the transistors 108-110 can be kept on, and the transistors 112-114 forming the voltage regulator 118 can be placed in a HiZ mode.

If the powered device is not operating in a specified mode, the method 400 can end. Otherwise, the specified mode is disabled at step 408, and the power regulator of the NVDC charger is turned on in a fast start mode at step 410. This could include, for example, the charge controller 120 causing the powered device 102 to exit the learn or peak power shift mode. This could also include the charge controller 120 turning on the voltage regulator 118 without a soft start or with a very fast soft start. In this way, the total delay time between removal/depletion of the power supply 107 and supplying power from the power adapter 104 is reduced significantly. This helps to reduce or minimize recovery time and prevent the powered device 102 from crashing.

Figure 5:
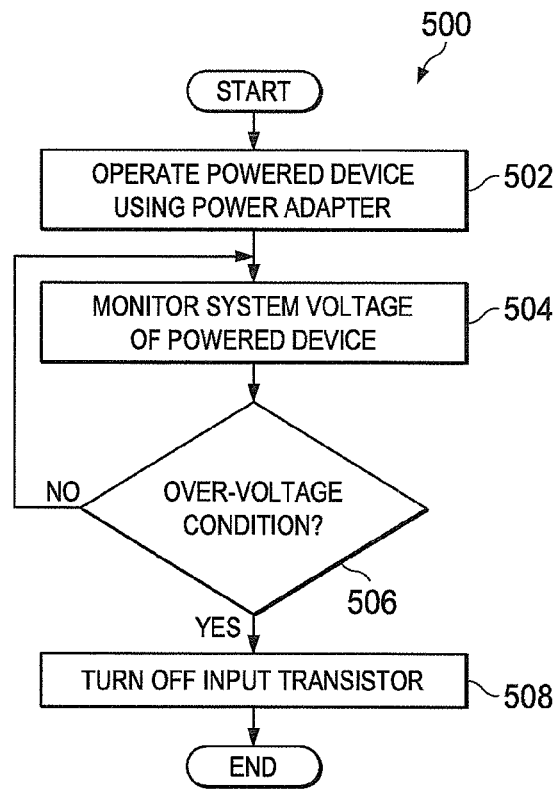
FIG. 5 illustrates an example method for providing overvoltage protection with an NVDC charger in accordance with this disclosure.

The NVDC charger 106 solves the third problem by providing over-voltage protection. FIG. 5 illustrates an example method 500 for providing over-voltage protection with an NVDC charger 106 in accordance with this disclosure. As shown in FIG. 5, a powered device is operated with a power adapter at step 502. This could include, for example, the system load 134 receiving operating power from the power adapter 104 and/or a battery or other power supply 107. As noted above, it is possible for the system load 134 to receive power from the power supply 107 even when the power adapter 104 is present.

The system voltage of the powered device is monitored at step 504. This could include, for example, the charge controller 120 monitoring the system voltage $V_{SYS}$ on the system bus 132 that is providing power from the voltage regulator 118 to the powered device 102.

A determination is made whether an over-voltage condition is occurring at step 506. This could include, for example, the charge controller 120 determining whether the measured system voltage exceeds a threshold. If not, the method 500 returns to step 504 to continue monitoring the system voltage. Otherwise, an input transistor is turned off at step 508. This could include, for example, the charge controller 120 immediately turning the transistor 108 off when the over-voltage condition is detected.

Conventional NVDC chargers place the transistors of their voltage regulators into the HiZ mode during a system over-voltage condition. However, if the high-side transistor 112 of the voltage regulator 118 is shorted, this does not prevent the input power from connecting to the system rail. By turning off the transistor 108, all circuits connected to the system rail can be protected.

To summarize, the charge controller 120 shown here is able to optimize both adapter power usage and system performance, prevent a system crash when the power supply 107 is removed or depleted in certain modes, and prevent damage during an over-voltage condition. The charge controller 120 can therefore resolve the various problems associated with conventional NVDC chargers described above.

Although FIGS. 1 through 5 illustrate one example of an NVDC charger 106 and related details, various changes may be made to FIGS. 1 through 5. For example, the functional division shown in FIG. 1 is for illustration only. Various components in FIG. 1 could be combined, further subdivided, or omitted and additional components could be added according to particular needs. Also, the behavior of an NVDC charger using a conventional DPM algorithm shown in FIG. 2 is for illustration only. In addition, while FIGS. 3 through 5 each illustrates a series of steps, various steps in each figure could overlap, occur in parallel, or occur any number of times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document.

The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   detecting removal or depletion of a power supply associated with a powered device, the powered device configured to receive power from a power adapter via a narrow-voltage direct current/ direct current (NVDC) charger and from the power supply;
   in response to the detection, disabling a dynamic power management (DPM) function of the NVDC charger;
   monitoring input current or input power provided to the powered device by the NVDC charger;
   determining if the input current or input power exceeds a threshold; and
   if the input current or input power exceeds the threshold, triggering a throttling of an operating clock frequency of the powered device, wherein:
   the NVDC charger comprises a voltage regulator, a first transistor coupled to the power adapter, and a second transistor coupled between the first transistor and the voltage regulator; and the input current flows through the first transistor, the second transistor, and the voltage regulator to the powered device; and
   further comprising:
   monitoring a system voltage provided by the NVDC charger to the powered device; and
   upon determining that the system voltage exceeds a second threshold, turning off the first transistor.

2. The method of claim 1, further comprising, in response to the detection:
   determining whether the powered device is operating in a specified mode of operation, wherein during the specified mode of operation (i) the first and second transistors are turned on and (ii) third and fourth transistors in the voltage regulator are placed into a high impedance state; and
   in response to determining that the powered device is operating in the specified mode of operation, disabling the specified mode of operation and turning on the voltage regulator.

3. The method of claim 2, wherein the specified mode of operation comprises one of:
   a learn mode in which the powered device calibrates how a state of charge of the power supply is determined; and
   a peak power shift mode in which the powered device shifts usage of power from the power adapter from one time to another time.

4. The method of claim 2, wherein turning on the voltage regulator comprises turning on the voltage regulator without performing a soft start.

5. The method of claim 1, wherein detecting removal or depletion of the power supply comprises detecting removal or depletion of the power supply during operation of the powered device in which the powered device receives power from both the power adapter and the power supply.

6. The method of claim 5, wherein the throttling maximizes usage of power from the power adapter ahead of usage of power from the power supply.

7. An apparatus comprising:
   a narrow-voltage direct current/direct current (NVDC) charger configured to be coupled to a power adapter and a powered device, the NVDC charger comprising a voltage regulator, a first transistor configured to be coupled to the power adapter, and a second transistor coupled between the first transistor and the voltage regulator wherein the NVDC charger comprises a charge controller configured to monitor a system voltage provided by the NVDC charger to the powered device and, upon determining that the system voltage exceeds a second threshold, turn off the first transistor and configured to:
   detect removal or depletion of a power supply associated with the powered device;
   in response to the detection, disable a dynamic power management (DPM) function of the NVDC charger;
   monitor input current or input power provided to the powered device by the NVDC charger;
   allow the power adapter to operate up to its full capacity;
   determine if input current or input power exceeds a threshold determined by the power or current capacity of the power adapter; and
   if the input current or input power exceeds the threshold, trigger a throttling of an operating clock frequency of the powered device.

8. The apparatus of claim 7, wherein the NVDC charger comprises:
   a charge controller configured to detect the removal or depletion of the power supply; and
   a comparator configured to determine if the input current or input power provided to the powered device by the NVDC charger exceeds the threshold.

9. An apparatus comprising:
   a narrow-voltage direct current/direct current (NVDC) charger configured to be coupled to a power adapter and a powered device, the NVDC charger comprising a voltage regulator, a first transistor configured to be coupled to the power adapter, and a second transistor coupled between the first transistor and the voltage regulator and configured to:
   detect removal or depletion of a power supply associated with the powered device;
   in response to the detection, disable a dynamic power management (DPM) function of the NVDC charger;
   monitor input current or input power provided to the powered device by the NVDC charger;

allow the power adapter to operate up to its full capacity;

determine if input current or input power exceeds a threshold determined by the power or current capacity of the power adapter; and if the input current or input power exceeds the threshold, trigger a throttling of an operating clock frequency of the powered device, wherein the NVDC charger comprises a charge controller configured to:

determine whether the powered device is operating in a specified mode of operation, wherein during the specified mode of operation (i) the first and second transistors are turned on and (ii) third and fourth transistors in the voltage regulator are placed into a high impedance state; and in response to determining that the powered device is operating in the specified mode of operation, disable the specified mode of operation and turn on the voltage regulator, wherein the charge controller is configured to turn on the voltage regulator without performing a soft start.

10. The apparatus of claim 7, wherein the NVDC charger is configured to detect removal or depletion of the power supply during operation of the powered device in which the powered device receives power from both the power adapter and the power supply.

11. A system comprising:

a powered device associated with a power supply;

a power adapter; and a narrow-voltage direct current/direct current (NVDC) charger configured to be coupled to the power adapter and the powered device, the NVDC charger configured to:

detect removal or depletion of the power supply;

in response to the detection, disable a dynamic power management (DPM) function of the NVDC charger;

monitor input current or input power provided to the powered device by the NVDC charger;

determine if the input current or input power exceeds a threshold; and if the input current or input power exceeds the threshold, trigger a throttling of an operating clock frequency of the powered device, wherein the NVDC charger comprises a voltage regulator, a first transistor configured to be coupled to the power adapter, and a second transistor coupled between the first transistor and the voltage regulator and the NVDC charger comprises a charge controller configured to monitor a system voltage provided by the NVDC charger to the powered device and, upon determining that the system voltage exceeds a second threshold, turn off the first transistor.

12. The system of claim 11, wherein the NVDC charger comprises a charge controller configured to:

determine whether the powered device is operating in a specified mode of operation, wherein during the specified mode of operation (i) the first and second transistors are turned on and (ii) third and fourth transistors in the voltage regulator are placed into a high impedance state; and in response to determining that the powered device is operating in the specified mode of operation, disable the specified mode of operation and turn on the voltage regulator.

13. The system of claim 11, wherein the powered device comprises a laptop or notebook computer.

* * * * *